United States Patent
Tsou (10) Patent No.: US 10,146,927 B2
(45) Date of Patent: Dec. 4, 2018

(54) DYNAMIC KEYPAD FOR ACCESS CODE INPUT

(71) Applicant: FUJITSU LIMITED, Kawasaki-shi, Kanagawa (JP)

(72) Inventor: I-wen Tsou, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 15/478,034

(22) Filed: Apr. 3, 2017

(65) Prior Publication Data
US 2018/0285547 A1 Oct. 4, 2018

(51) Int. Cl.
*G06F 21/36* (2013.01)
*G06F 3/0488* (2013.01)

(52) U.S. Cl.
CPC .......... *G06F 21/36* (2013.01); *G06F 3/04886* (2013.01)

(58) Field of Classification Search
CPC ........ G06F 3/04815–3/04817; G06F 3/04886; G06F 21/31; G06F 21/36; H04W 12/02; H04W 12/06; H04W 12/08
See application file for complete search history.

(56) References Cited

U.S. PATENT DOCUMENTS

| | | | | |
|---|---|---|---|---|
| 2004/0257238 A1* | 12/2004 | De Jongh | ........... | G06F 3/04886 340/5.85 |
| 2014/0215601 A1* | 7/2014 | Rittle | ...................... | G06F 21/36 726/16 |
| 2014/0245433 A1* | 8/2014 | Bao | ........................ | G06F 21/31 726/19 |

OTHER PUBLICATIONS

MailOnline, T. R. (Feb. 6, 2015). Is it Ever safe to use a cashpoint? This chilling investigation reveals there's Lots more to worry about when taking out your money. Retrieved Apr. 12, 2017, from http://www.dailymail.co.uk/news/article-2943429/Is-safe-use-cashpoint-chilling-investigation-reveals-s-LOTS-worry-taking-money.html.

Aviv, A. J., Gibson, K. L., Mossop, E., Blaze, M., & Smith, J. M. (2010). Smudge Attacks on Smartphone Touch Screens. Woot, 10, 1-7.

Lock screen passcode numbers position randomizer. r/jailbreak. (n.d.). Retrieved Apr. 12, 2017, from https://www.reddit.com/r/jailbreak/comments/2080jf/request_lock_screen_passcode_numbers_position/.

* cited by examiner

*Primary Examiner* — Kevin Bechtel
(74) *Attorney, Agent, or Firm* — Maschoff Brennan (57) ABSTRACT

A method to generate a dynamic keypad for access code input includes identifying a screen size of display of a computer device by accessing a configuration file associated with the display. The method includes identifying a set of possible objects for an access code. The method further includes generating a first set of electronic keys based on the set of possible objects for the access code and based on the screen size of the display. The method also includes generating a second set of electronic keys based on the screen size of the display. The method includes generating a keypad that includes the first set of electronic keys and the second set of electronic keys. The method further includes presenting the keypad in the display of the computer device.

17 Claims, 8 Drawing Sheets

| 9s | 1A | 3 |
| 31P | 4 | W |
| 9 | z0 | x7 |
| C2 | 8L6 | |

| 7 | B | 7r8 |
| 87 | x | zK |
| W | A | 49 | 3 |
| 1 | 25 | 6 | P |

| 6 | 0 | 302 |
| 58 | 4 | 9 | 8 |
| 1 | 3 | 213 |
| 7 | 5 | 72 | 2 |

| 2 | b9 | 15 |
| d5 | 6 | aM |
| 7 | z83 | 4 |
| 77 | 67 | 5 |

DYNAMIC KEYPAD FOR ACCESS CODE INPUT

FIELD

The embodiments discussed herein are related to a dynamic keypad for access code input.

BACKGROUND

Electronic devices are often secured using access codes. A successful entry of an access code to the electronic device may provide access to the electronic device while an incorrect entry of the access code may prevent access to the electronic device.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method to generate a dynamic keypad for access code input includes identifying a screen size of display of a computer device by accessing a configuration file associated with the display. The method includes identifying a set of possible objects for an access code. The method further includes generating a first set of electronic keys based on the set of possible objects for the access code and based on the screen size of the display. The method also includes generating a second set of electronic keys based on the screen size of the display. The method includes generating a keypad that includes the first set of electronic keys and the second set of electronic keys. The method further includes presenting the keypad in the display of the computer device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Passwords and personal identification numbers (PINs) are popular methods to authenticate users to access their electronic devices, accounts and information. For example, automated teller machines (ATM) around the world use PINs for bank account access, and people all over the world are using passcodes to unlock their smartphones.

However, a fixed numeric keypad or QWERTY keyboard for access code input have many problems. First, people nearby can easily take a peek of the hand movement of the user pressing the number and see the key position. The fixed numeric keypad is used almost ubiquitously in ATMs, smartphones, tablets, personal computers (PCs), store points of sale (POS) machines, safe boxes, etc., and it is usually is unlocked using a 4 or 6 digit code. Since the position of each number is fixed, it maybe be easy for others to peek during the input time, recognize the position of the input number, and gain unauthorized access to the access code with only a quick look. Some prior approaches may include changing the positioning of various numbers in the numeric keypad. Since many PINs and passcode are typically between 4-8 digits, even when merely the layout is changed, an attacker may still be able to figure out the number positions (and the access code). Thus, merely changing the layout of a numeric keyboard may still be prone to attacks.

Secondly, for electronic devices with touch-screens, malicious individuals may attempt to gain access to the electronic devices using a "smudge attack" by detecting the finger smudges or oily residue on the screen. Some studies suggest that smudge attacks are around 68% effective at gaining unauthorized access to an electronic device.

Even for emerging devices such as augmented reality devices (AR) and virtual reality devices (VR), which the users may provide input into the air, others can guess the access code by the hand position, which may be particular effective against numeric pins, because of the fixed position for all the numbers in the conventional numeric keypad.

Aspects of the present disclosure address these and other shortcomings by providing a dynamic keypad for access code input. Device manufacturers, software developers, service vendors, and others may use the dynamic keypad for access code input in their products to help improve user security. Further, the dynamic keypad for access code input provides improvements to various computer-related and technology-based systems, including improvements over hardware and software-based keyboards and numeric keypads (including AR and VR keyboards and keypads).

While a fixed position keypad or keyboard may work for standard usage and universal access, for some situations, such as access code input, the dynamic keyboard may be beneficial. For example, since the numeric keypad for a smartphone may typically be generated by software, the dynamic keypad may be used in situations where it may be beneficial to periodically change the layout of the keypad. The dynamic keypad may do more than just change positioning of the numbers and/or letters in the keypad.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale.

Throughout the drawings, like numbers generally reference like structures unless described otherwise.

As the term is used herein, "keypad" may refer to any type of keyboard, keypad, input device, hardware keyboard, software keyboard, projected keyboard, or any other hardware-based or software-based device configured to receive input.

As the term is used herein, "access code" may refer to any type of code used to control access. Example access codes may include a PIN, a passcode, a password, etc.

Figure 1:
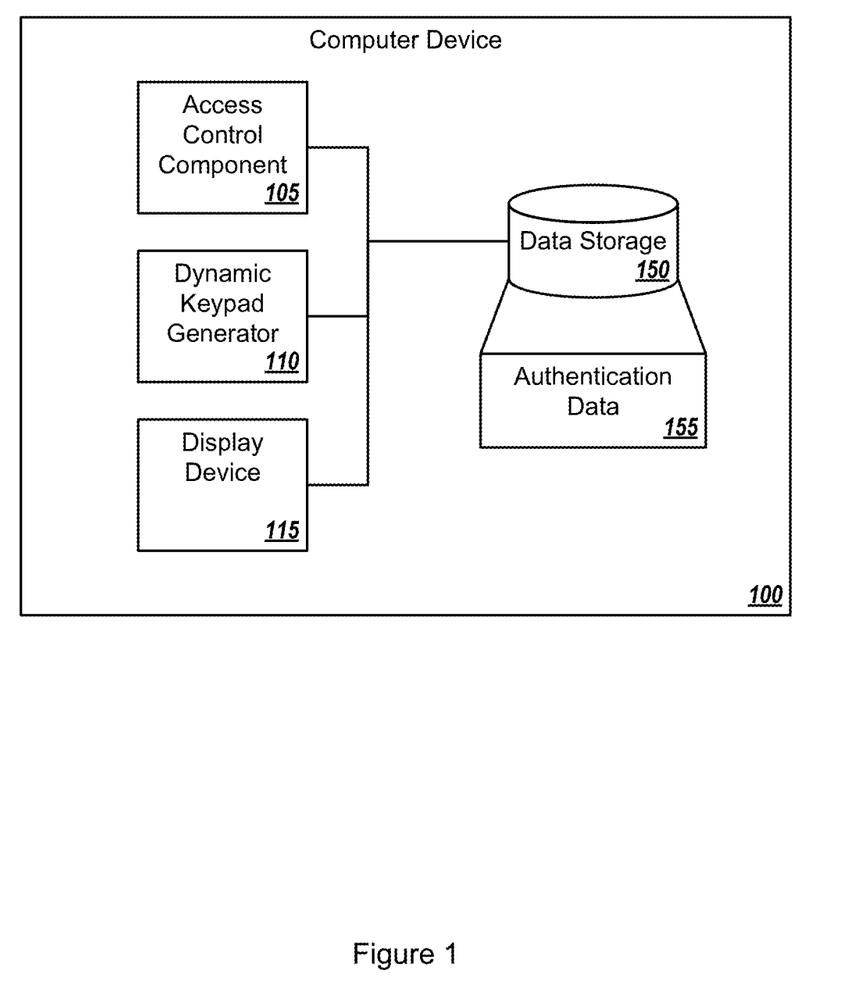
FIG. 1 illustrates a block diagram of an example computer device that includes a dynamic keypad configured to receive passcode input.

FIG. 1 illustrates a block diagram of an example computer device 100 that includes a dynamic keypad configured to receive passcode input, arranged in accordance with at least one embodiment described herein. The computer device 100 includes an access control component 105, a dynamic keypad generator 110, a display device 115, and a data storage 150.

The computer device 100 may include a processor-based computing system. The computer device 100 may include memory, one or more processors, and network communication capabilities. Some examples of the computer device 100 may include a mobile phone, a smartphone, a tablet computer, a laptop computer, a desktop computer, a set-top box, a virtual reality (VR) device, an augmented reality (AR) device, or a connected device, etc.

The display device 115 may include any type of device capable to display information. For example, the display device 115 may include any hardware device configured to receive and display the information, including a dynamic keypad. The display device 115 may include a virtual-reality unit, an augmented-reality unit, a two-dimensional display device, or a three-dimensional display device, a cathode ray tube display (CRT), a light-emitting diode display (LED), a projector, an electroluminescent display (ELD), an electronic paper device, a plasma display panel (PDP), a liquid crystal display (LCD), an organic LED (OLED), a swept-volume display, a varifocal mirror display, an emissive volume display, or some combination thereof.

The data storage 150 may include any memory or data storage. The data storage 150 may include authentication data 155 pertaining to accessing the computer device 100. For example, the data storage 150 may include one or more valid access codes that may be stored as authentication data 155. When storing the one or more access codes in the data storage 150, the processor may encrypt, hash, or apply any other type of security or obfuscation to the one or more valid access codes. The data storage 150 may include network communication capabilities. In some embodiments, the data storage 150 may include computer-readable storage media for carrying or having computer-executable instructions or data structures stored thereon. The computer-readable storage media may include any available media that may be accessed by a general-purpose or special-purpose computer, such as a processor. For example, the data storage 150 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 150.

The access control component 105 may manage user access to the computer device 100. A user may provide input to the access control component 105 pertaining to an access code that may be used to restrict access to the computer device 100. The input may relate to any type of object that may be used for an access code. The objects may include or may pertain to alphanumeric characters, symbols, icons, sounds, haptic inputs, etc. For example, a user may input an alphanumeric passcode that may be used to gain access to the computer device 100. The access code may include at least one user-defined symbol. For example, a user may draw a symbol on a touch screen and select that symbol to be included in the access code. In at least one embodiment, the access code may include one or more unconventional keys. The user input (e.g., the valid access code) may be stored in the data storage 150 as authentication data 155 and/or may be sent to a remote location to be stored. The access control component 105 may prevent access to the computer device 100 until receiving input corresponding to a valid access code. For example, the access control component 105 may receive user input, such as via the dynamic keypad generator 110 displayed on the display device 115. The access control component 105 may check an access code database (e.g., the data storage 150) for an access code that corresponds to the user input. When the access code corresponds to the user input, the access control component 105 may provide access to the computer device 100, such as by unlocking the screen of the computer device 100. The access control component 105 may permit an activity based on the receipt of the access code. The activity may include at least one of: access to the computer device 100, a financial transaction, or access to a remote device, among other activities.

The access control component 105 may be implemented using hardware including a processor, a microprocessor (e.g., to perform or control performance of one or more operations), an FPGA, or an ASIC. In some other instances, the access control component 105 may be implemented using a combination of hardware and software. Implementation in software may include rapid activation and deactivation of one or more transistors or transistor elements such as may be included in hardware of the computer device 100. Additionally, software defined instructions may operate on information within transistor elements. Implementation of software instructions may at least temporarily reconfigure electronic pathways and transform computing hardware.

The dynamic keypad generator 110 may be configured to dynamically generate a keypad for display on the display device 115. The dynamic keypad generator 110 may provide a dynamically changing numeric, alphabetic, alphanumeric, symbolic keypad for users to enter an access code in a touchscreen device or a virtual device. The dynamic keypad generator 110 may generate the dynamic keypad with or without the knowledge of a valid access code. In at least one embodiment, the dynamic keypad generator 110 may have knowledge of the valid access code. When the dynamic keypad generator 110 knows the passcode before generating the dynamic keypad, the dynamic keypad generator 110 may create a more complicated dynamic keypad. As a result, users may choose a more complicated access code as compared to when the dynamic keypad generator 110 does not have knowledge of the valid access code. Example dynamic keypads are illustrated and further described in conjunction with FIGS. 3-7. The dynamic keypad generator 110 may be configured to dynamically generate multiple keypads using the same set of keys.

The dynamic keypad generator 110 may be implemented using hardware including a processor, a microprocessor (e.g., to perform or control performance of one or more operations), an FPGA, or an ASIC. In some other instances, the dynamic keypad generator 110 may be implemented using a combination of hardware and software. Implementation in software may include rapid activation and deactivation of one or more transistors or transistor elements such as may be included in hardware of the computer device 100. Additionally, software defined instructions may operate on information within transistor elements. Implementation of software instructions may at least temporarily reconfigure electronic pathways and transform computing hardware.

In at least one embodiment, the dynamic keypad generator 110 may be turned on or off. For example, some users may desire to toggle between the dynamic keypad and a fixed keypad and may provide input pertaining to which keyboard type the dynamic keypad generator 110 may generate.

In at least one embodiment, the dynamic keypad may be used in various devices such as VR/AR devices and with projected screen applications where the concept of a "keypad" may extend into a 3D space. For example, the dynamic keypad may be presented in more sophisticated ways including allowing user interaction with the keypads, such as permitting a user to move the keys, rotate the keys, flip the keys, color the keys, or draw a user defined key, etc.

Modifications, additions, or omissions may be made to the computer device 100 without departing from the scope of the present disclosure. Specifically, the computer device 100 may include one or more access control components 105, one or more dynamic keypad generators 110, one or more display devices 115, one or more data storages 150, or any combination thereof.

Moreover, the separation of various components in the embodiments described herein is not meant to indicate that the separation occurs in all embodiments. It may be understood with the benefit of this disclosure that the described environment components may be integrated together in a single component or separated into multiple components.

Figure 2:
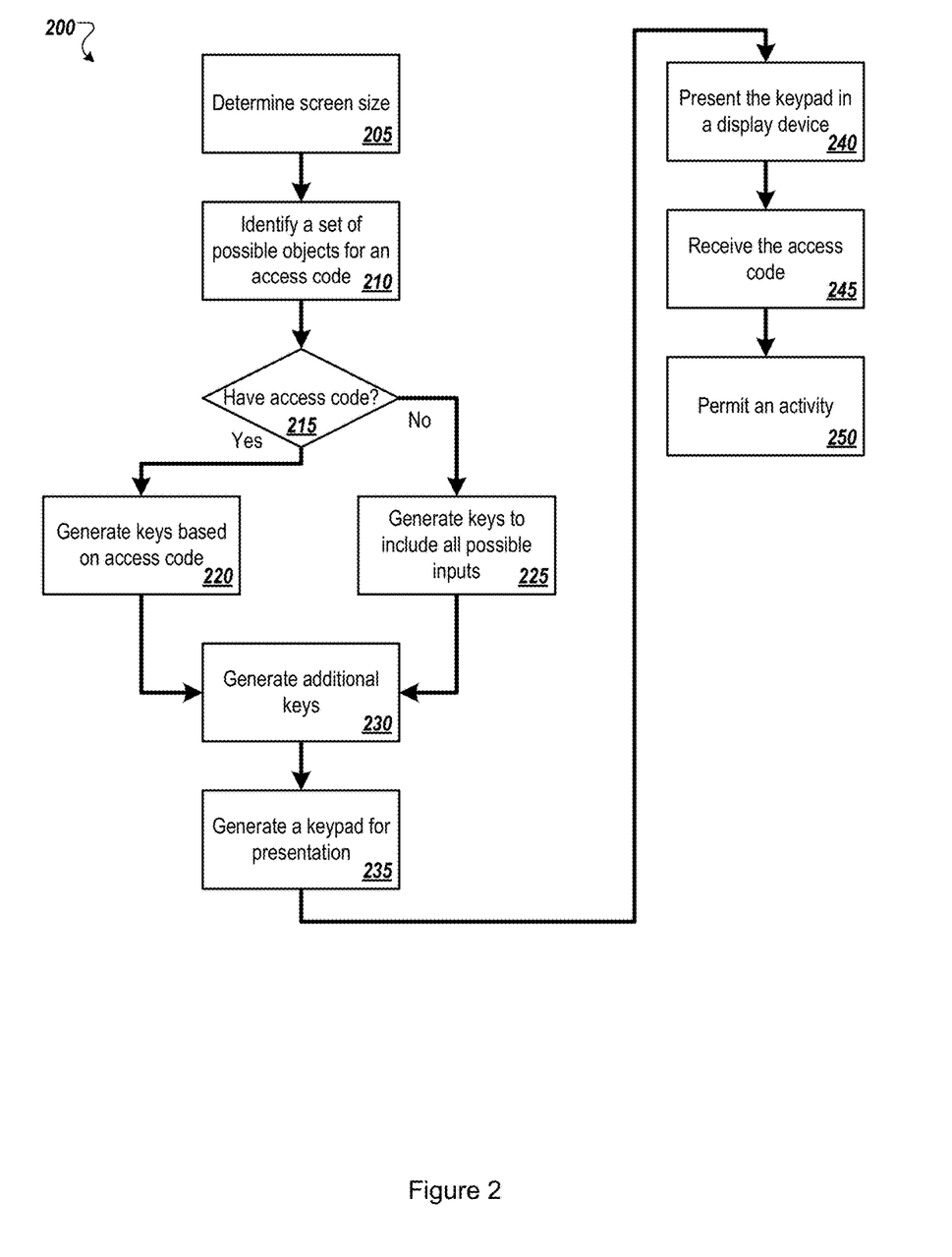
FIG. 2 illustrates a flow diagram of an example method related to providing a dynamic keypad for access code input.

FIG. 2 illustrates a flow diagram of an example method 200 related to providing a dynamic keypad for access code input. The method may be performed by processing logic that may include hardware (circuitry, dedicated logic, etc.), software (such as is run on a general purpose computer system or a dedicated machine), or a combination of both, which processing logic may be included in the computer device 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 200 may begin at block 205, where the processing logic may determine a screen size of a device on which the dynamic keypad may be presented. The device may include the computer device 100 and/or the display device 115 of FIG. 1. The processing logic may determine the screen size by accessing a configuration file associated with the device. The configuration file may include data indicative of the screen size of the device. The processing logic may also determine a screen resolution of the device. Using the screen size, the processing logic may determine how many key spaces may be available for that particular screen or displayed area.

At block 210, the processing logic may identify a set of possible objects for an access code. Identifying the set of possible objects for the access code may include determining an access code type. The access code type may include at least one of: numeric, alphabetical, alphanumeric, or symbolic. In at least one embodiment, the processing logic may perform block 210 after determining whether the processing logic has access to the access code at block 215.

At block 215, the processing logic may determine whether the processing logic has access to the access code. In some embodiments, the access code may be stored locally and the processing logic may have access to the locally stored access code. For example, the access code may be stored in a data storage. The processing logic may have access to some or all of the data in the data storage, including the access code. In at least one embodiment, the access code may be stored remotely and the processing logic may have access to the remotely stored access code.

Figure 3:
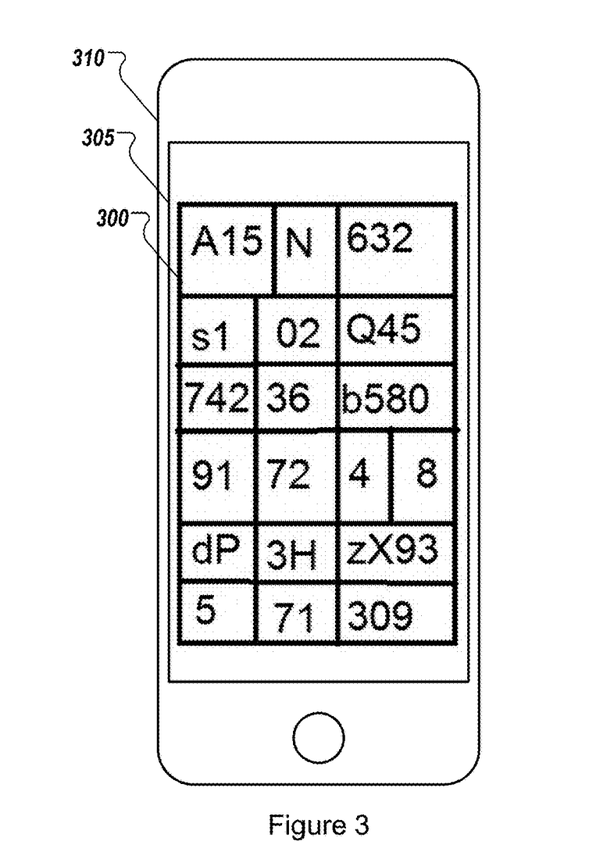
FIGS. 3-7 illustrate various configurations of dynamic keypads that may be generated by a dynamic keypad generator.

When the processing logic has access to the access code ("YES" at block 215), at block 220, the processing logic may generate one or more keys based on the access code. The one or more keys based on the access code may include one or keys, that when activated, provide input to access the device. The one or more keys may include one or more number, letter, and/or symbol of the access code. For example, one or more keys based on the access code may include a first key that includes a first portion of the access code, and a second key that includes a second portion of the access code. A selection of the first portion of the access code and the second portion of the access code may amount to an entry of the access code. Any number of portions of the access code may be provided by any number of keys. FIG. 3 illustrates an example dynamic keypad that includes one or more keys that were generated based on the access code.

When the processing logic has access to the access code ("YES" at block 215), at block 225, the processing logic may generate one or more keys to include all possible inputs that could be used for the access code. The processing logic may identify a parameter indicative of the all possible inputs that could be used for the access code. For example, the processing logic may determine that the access code may include only alphanumeric characters. The one or more keys may include one or more number, letter, and/or symbol of the access code. For example, in a system that receives numeric access codes using numbers between 0-9, the one or more keys may include the keys 0-9 to include all possible inputs that could be used for the access code. In another example, in a system that receives alphanumeric access codes using numbers between 0-9 and letters A-Z, the one or more keys may include the keys 0-9 and A-Z to include all possible inputs that could be used for the access code. FIG.

Figure 4:
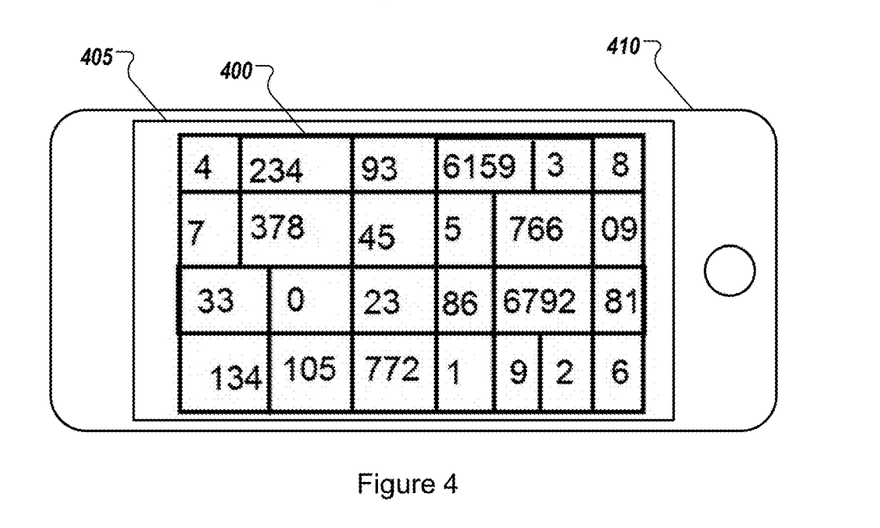

4 illustrates an example dynamic keypad that includes one or more keys to include all possible inputs that could be used for the access code.

At block 230, the processing logic may generate additional keys. The additional keys may include any number of keys that may be presented in the dynamic keypad such that objects that are not part of the access code may be presented in the dynamic keypad. For example, the additional keys may include numbers, letters and/or symbols, or combinations thereof, that are not part of the access code.

At block 235, the processing logic may generate a dynamic keypad for presentation in a display device (e.g., the display device 115 of FIG. 1). In at least one embodiment, the dynamic keypad may include one or more keys generated based on the access code (e.g., one or more keys generated at block 220). In at least one embodiment, the dynamic keypad may include one or more keys generated to include all possible inputs that could be used for the access code (e.g., one or more keys generated at block 225). In some embodiments, some or all of the various keys may include two objects. In some embodiments, some or all of the various keys may include three objects. In some embodiments, some or all of the various keys may include four objects. The dynamic keypad may be any shape or size. The various keys may be any shape or size. In at least one embodiment, the keys in the dynamic keypad are all the same shape and size. In at least one embodiment, at least some of the keys in the dynamic keypad are different shapes and sizes. The various keys may be positioned in any position (e.g., with respect to x, y coordinates) in the dynamic keypad. The various keys may be oriented in any orientation (e.g., sideways, upside-down) in the dynamic keypad.

At block 240, the processing logic may present the dynamic keypad in a display device, such as the display device 115 of FIG. 1. In at least one embodiment, the access code includes at least one three-dimensional object. Generating the first set of electronic keys may include generating the at least one three-dimensional object. The screen size of the display includes a three-dimensional area. For example, the screen size may include a three-dimensional space in which object may be projected or presented, such as via VR or AR. Presenting the keypad in the display of the computer device may include presenting the at least one three-dimensional object in the three-dimensional area.

At block 245, the processing logic may receive the access code via the dynamic keypad. At block 50, the processing logic may permit an activity based on the receipt of the access code.

In at least one embodiment, the processing logic may generate a second dynamic keypad for presentation in the display device. The second dynamic keypad may include the same set of access code keys and additional keys in a different configuration scheme. For example, the access code keys and additional keys in the second dynamic keypad may be positioned and/or oriented differently with respect to the first dynamic keypad. The processing logic may dynamically or randomly generate the dynamic keypad layout with different sizes for single or multiple keys and with at least some different keys from one keypad to the next. In this manner, various keypads may be generated for a single access code while reducing the ability of an onlooker to nefariously obtain the access code.

FIGS. 3-7 illustrate various configurations of dynamic keypads that may be generated by a dynamic keypad generator (e.g., the dynamic keypad generator 110 of FIG. 1) and may be generated using the method 200 of FIG. 2. The dynamic keypad may be presented via a graphical user interface (GUI). The example GUI may be presented on a display of a computer device. In some instances, the dynamic keypad may be presented as an overlay in front of content that is being presented on the display. In other examples, the dynamic keypad may be displayed on a lock screen. In another embodiment, the dynamic keypad may be an interface presented by a media viewer (e.g., an app, an application, a program, a software module/component, etc.). Some example GUIs include control elements in the form of a button (e.g., to perform an action). However, it should be noted that various other control elements can be used for selection by a user such as a check box, a link, or any other user interface elements.

FIG. 3 illustrates an example dynamic keypad 300 as it may be presented on a display 305 of a computer device 310. The dynamic keypad 300 may include one or more keys that were generated based on the access code. For example, the access code may be "72502." As illustrated, the dynamic keypad 300 may include one or more keys that includes one or more combinations of the access code "72502", such as "72", "5", and "02". Any variation of the access code "72502" may be used on a key. The dynamic keypad 300 also includes additional keys that may not pertain to the access code, such as the additional keys generated at block 225 of FIG. 2.

FIG. 4 illustrates an example dynamic keypad 400 as it may be presented on a display 405 of a computer device 410. The dynamic keypad 400 may include one or more keys to include all possible inputs that could be used for the access code. For example, the access code may be a numeric code using any combination of numbers between 0-9. The dynamic keypad 400 may be generated to include all digits between 0-9 so as to permit a correct entry of the access code via the dynamic keypad 400. As illustrated, the dynamic keypad 400 includes, as single digits, the numbers 0-9. The dynamic keypad 400 also includes additional keys that may not pertain to the access code, such as the additional keys generated at block 225 of FIG. 2.

FIGS. 5A-5D illustrate example dynamic keypads as they may be presented on a computer device.

Figure 5A:
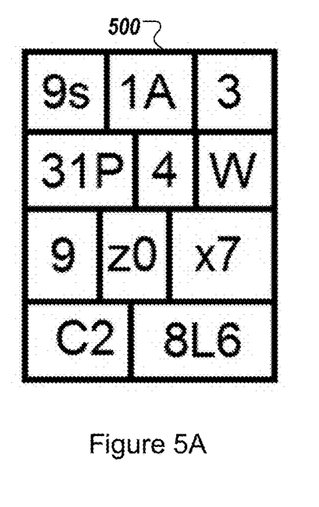

FIG. 5A illustrates an example dynamic keypad 500, where the access code is "491Ax7" and is locally known. The screen size may be of a size that can accommodate 4×5, for a total of 20 single keys spaces. A dynamic keypad generator (e.g., the dynamic keypad generator 110 of FIG. 1) may generate access code keys "4", "9", "1A", "x7", which may use a total of six key spaces because two-character keys may take up the space of two keys. The dynamic keypad generator may generate the additional fourteen key spaces randomly from numbers and alphabetic letters as: "3", "W", "z0", "8L6", "C2", "31P", "9s". The dynamic keypad generator may generate the dynamic keypad 500 with the access code keys and the random keys, and assign the position within the dynamic keypad randomly.

Figure 5B:
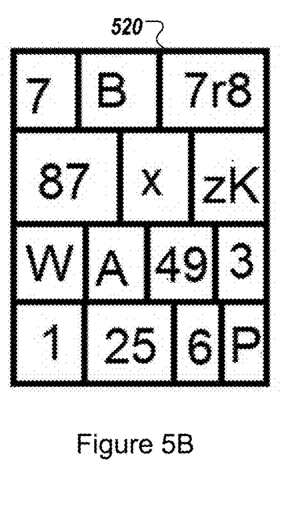

FIG. 5B illustrates an example dynamic keypad 520, where the access code is also "491Ax7" and is locally known. The screen size may be of a size that can accommodate 4×5, for a total of 20 single keys spaces. The dynamic keypad generator may generate access code keys "49", "1", "A", "x", "7", for a total of 6 key spaces. The dynamic keypad generator may generate the additional 14 keys randomly from numbers and alphabetic letters, such as: "25", "B", "87", "zK", "6", "3", "P", "W", "7r8." The dynamic keypad generator may generate the keypad 520 with the access code keys and the random keys, and assign the position within the dynamic keypad randomly. The dynamic keypad 500 and the dynamic keypad 520 may both be generated for and presented by the same computer device at different times.

Figure 5C:
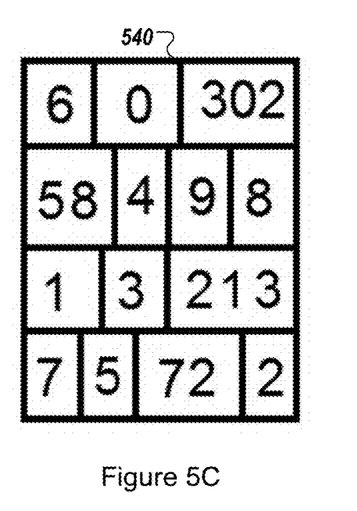

FIG. 5C illustrates an example dynamic keypad 540, where the access code is "6772" and is locally unknown by the dynamic keypad generator. The dynamic keypad generator may have data indicating that the access code is a numeric code that includes the numbers 0-9. The screen size may be of a size that can accommodate 4×5, for a total of 20 single keys spaces. The dynamic keypad generator may generate the access code keys as "0", "1", "2", "3", "4", "5", "6", "7", "8", "9", "0" for a total 10 key spaces. The dynamic keypad generator may generate the additional 10 keys randomly from numbers as: "213", "72", "302", "58". The dynamic keypad generator may generate the dynamic keypad 540 with the access code keys and the random keys, and assign the position within the dynamic keypad randomly.

Figure 5D:
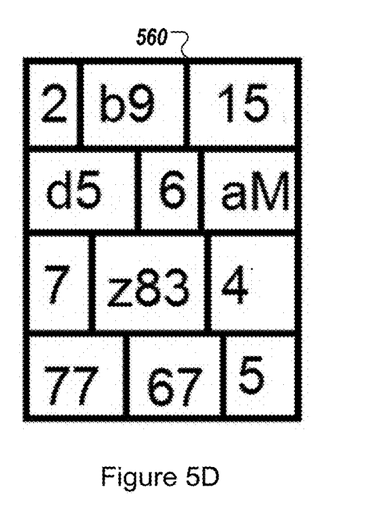

FIG. 5D illustrates an example dynamic keypad 560, where the access code is "6772" and is locally known by the dynamic keypad generator. The screen size may be of a size that can accommodate 4×5, for a total of 20 single keys spaces. The dynamic keypad generator may generate the access code keys as "6", "77", "2", for a total 10 key spaces. The dynamic keypad generator may generate the additional 16 keys randomly from numbers and alphabetic letters as: "15", "aM", "4", "67", "b9", "z83", "d5", "5", "7". The dynamic keypad generator may generate the dynamic keypad 560 with the access code keys and the random keys, and assign the position within the dynamic keypad randomly. The dynamic keypad 540 and the dynamic keypad 560 may both be generated for and presented by the same computer device at different times.

Figure 6:
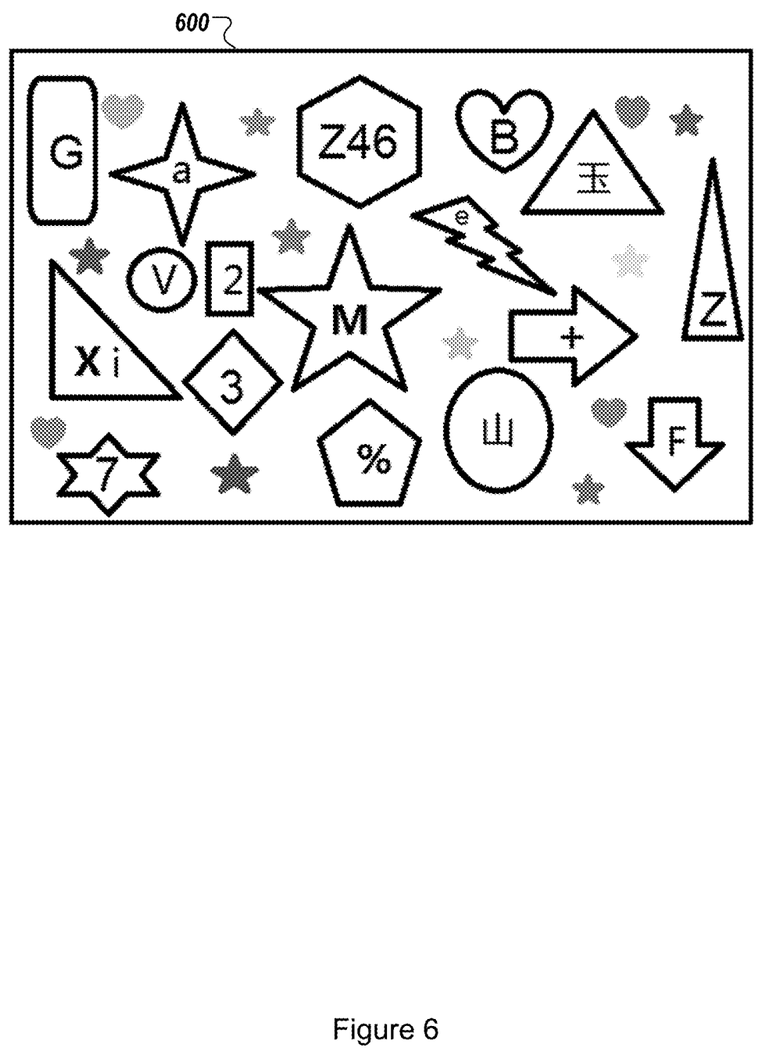
Figure 9A:
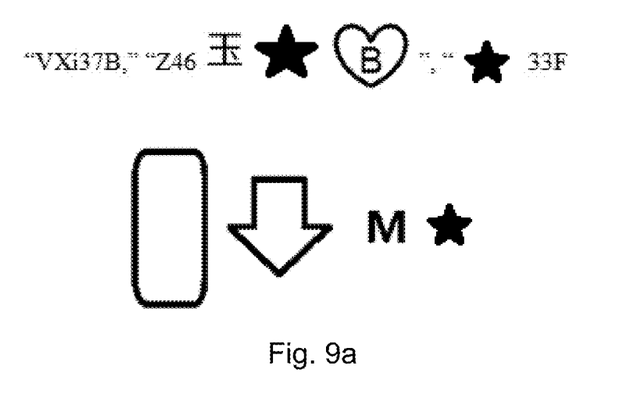
FIGS. 9a, 9b and 9c illustrate examples of graphical objects that can be selected for us in access codes, all arranged in accordance with at least one embodiment described herein.

FIG. 6 illustrates an example dynamic keypad 600 as it may be presented on a computer device. The dynamic keypad 600 is illustrated as having keys of different sizes and shapes, with different types of objects (e.g., symbols, characters). Using different types of keys may be beneficial particularly to embodiments where the dynamic keypad generator knows the access code. In such embodiments, a user can choose more complicated access codes (e.g., using different languages, special characters, objects, shapes, colors), or even user defined symbols. Depending on the sensitivity and the margin of the screen, the user can touch some part of the key to refer to different input. Example access codes that may be entered using the dynamic keypad 600 may include those shown in FIG. 9a.

Figure 7:
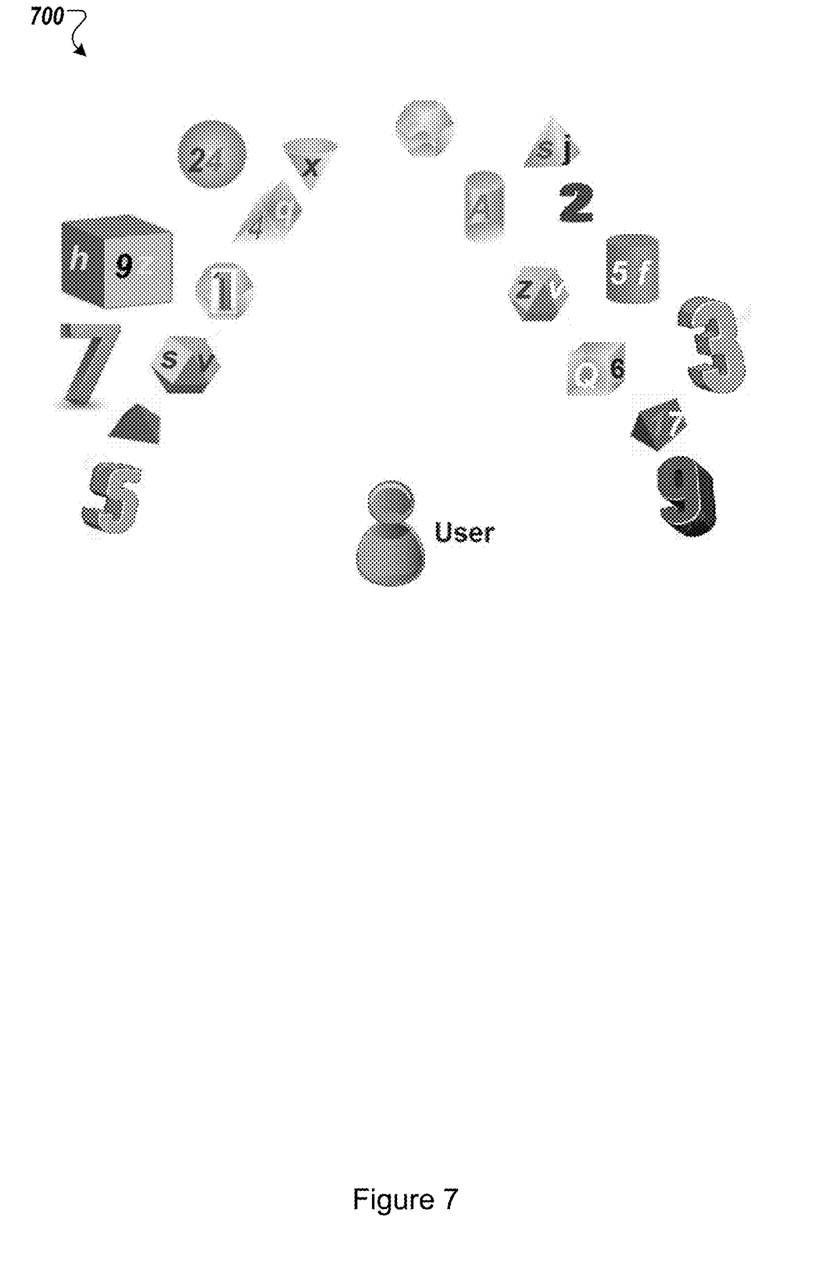

FIG. 7 illustrates an example dynamic keypad 700 as it may be presented via a computer device. The computer device may include an AR or VR device. The dynamic keypad 700 is illustrated as having keys of different sizes and shapes, with different types of objects (e.g., symbols, characters) and may have multiple dimensions, (e.g., 3D, 4D). For example, each "key" can include a 3D object, and may be presented in a 3D space. A user-defined 3D object may be a key. A layout of the dynamic keypad may spread into the 3D space. The 3D space may include multiple 3D keypads. Each 3D keypad may include single or multiple keys in each surface. Each 3D keypad can rotate, move or flip in the 3D space.

Figure 9B:
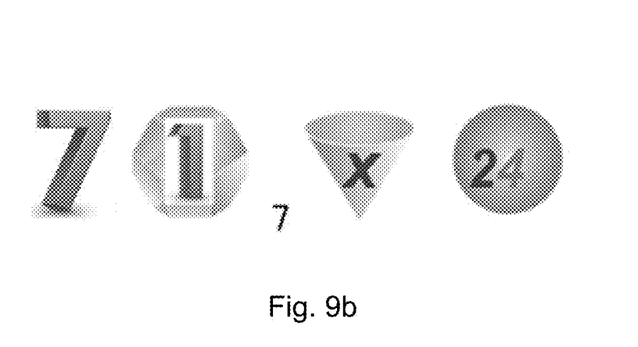
Figure 9C:
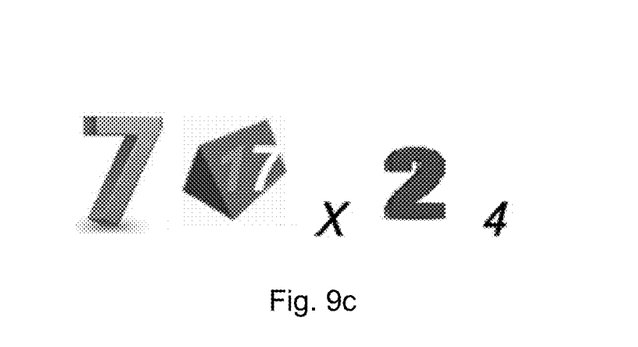

Example access codes that may be entered in a 3D AR/VR projected space using the dynamic keypad 700 may include "717×24" (e.g., an alphanumeric combination). Using the available keys, a first method of inputting the access code may include a selection of the objects shown in FIG. 9b. A second method of inputting the access code may include a selection of the objects shown in FIG. 9c.

Figure 8:
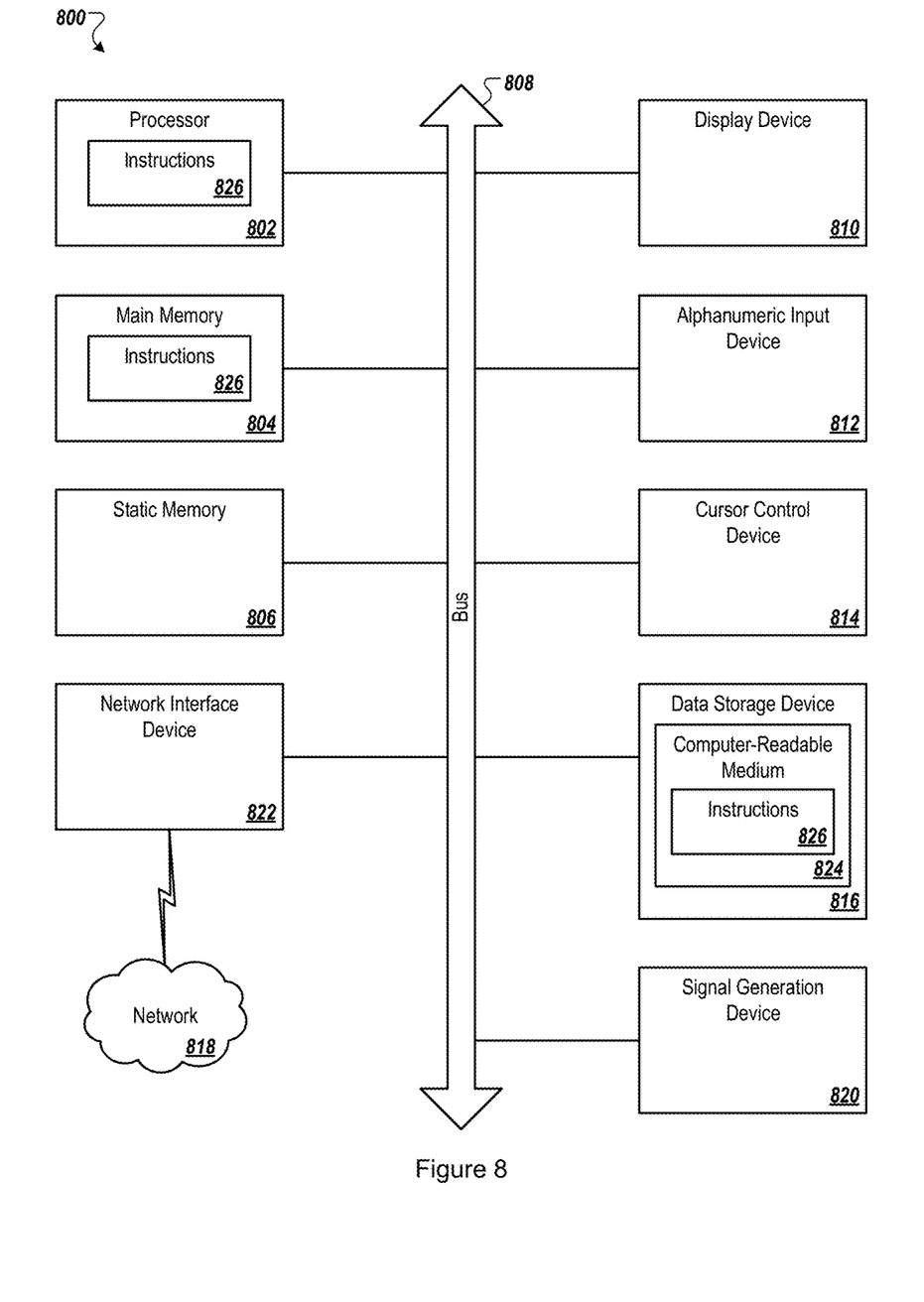
FIG. 8 illustrates a diagrammatic representation of a machine in the example form of a computing device within which a set of instructions, for causing the machine to perform any one or more of the methods discussed herein, may be executed.

FIG. 8 illustrates a diagrammatic representation of a machine in the example form of a computing device 800 within which a set of instructions, for causing the machine to perform any one or more of the methods discussed herein, may be executed. The computing device 800 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In one implementation, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 (e.g., computer device 100 of FIG. 1) embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Modifications, additions, or omissions may be made to any of the methods described without departing from the scope of the present disclosure. Specifically, any of the methods described may include more or fewer blocks. Further, the blocks in any of the methods described may be arranged in a different order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method, comprising:
    identifying a screen size of a display of a computer device by accessing a configuration file associated with the display;
    identifying a set of possible objects for a stored access code, wherein the possible objects comprise portions of the stored access code;
    generating a first set of electronic keys based on the set of possible objects for the access code and based on the screen size of the display, wherein each electronic key of the first set of electronic keys comprises an alphanumeric or symbolic character of the stored access code, and wherein at least one electronic key of the first set of electronic keys comprises a sequence of alphanumeric or symbolic characters of the stored access code;
    generating a second set of electronic keys based on the screen size of the display, wherein each electronic key of the second set of electronic keys comprises an alphanumeric or symbolic character that is not a part of the stored access code;
    generating a keypad that includes the first set of electronic keys and the second set of electronic keys; and
    presenting the keypad in the display of the computer device.

2. The method of claim 1 further comprising:
    receiving the access code via the first set of electronic keys; and
    permitting an activity based on the receipt of the access code.

3. The method of claim 2, wherein the activity includes at least one of: access to the computer device, a financial transaction, or access to a remote device.

4. The method of claim 1, wherein the generating the first set of electronic keys based on the set of possible objects for the access code comprises:
    identifying the access code in a data storage.

5. The method of claim 1, wherein the first set of electronic keys comprises all possible objects for the access code.

6. The method of claim 1, wherein the identifying the set of possible objects for the access code comprises determining an access code type, wherein the access code type includes at least one of: numeric, alphabetical, alphanumeric, or symbolic.

7. A system, comprising:
a display device;
a memory; and
a processor operatively coupled to the memory, the processor being configured to perform operations comprising:
identifying a screen size of the display device by accessing a configuration file associated with the display device;
identifying a set of possible objects for a stored access code, wherein the possible objects comprise portions of the stored access code;
generating a first set of electronic keys based on the set of possible objects for the access code and based on the screen size of the display, wherein each electronic key of the first set of electronic keys comprises an alphanumeric or symbolic character of the stored access code, and wherein at least one electronic key of the first set of electronic keys comprises a sequence of alphanumeric or symbolic characters of the stored access code;
generating a second set of electronic keys based on the screen size of the display, wherein each electronic key of the second set of electronic keys comprises an alphanumeric or symbolic character that is not a part of the stored access code;
generating a keypad that includes the first set of electronic keys and the second set of electronic keys; and
presenting the keypad in the display device.

8. The system of claim 7, the operations further comprising:
receiving the access code via the first set of electronic keys; and
permitting an activity based on the receipt of the access code.

9. The system of claim 8, wherein the activity includes at least one of: access to the system, a financial transaction, or access to a remote device.

10. The system of claim 7, wherein when generating the first set of electronic keys based on the set of possible objects for the access code, the processor being configured to perform operations comprising:
identifying the access code in a data storage.

11. The system of claim 7, wherein when identifying the set of possible objects for the access code, the processor being configured to perform operations comprising determining an access code type, wherein the access code type includes at least one of: numeric, alphabetical, alphanumeric, or symbolic.

12. The system of claim 7, wherein the access code includes at least one three-dimensional object, wherein generating the first set of electronic keys comprises generating the at least one three-dimensional object, wherein the screen size of the display includes a three-dimensional area, wherein presenting the keypad in the display of the computer device comprises presenting the at least one three-dimensional object in the three-dimensional area.

13. A non-transitory computer-readable medium having encoded therein programming code executable by a processor to perform or control performance of operations comprising:
identifying a screen size of a display of a computer device by accessing a configuration file associated with the display;
identifying a set of possible objects for a stored access code, wherein the possible objects comprise portions of the stored access code;
generating a first set of electronic keys based on the set of possible objects for the access code and based on the screen size of the display, wherein each electronic key of the first set of electronic keys comprises an alphanumeric or symbolic character of the stored access code, and wherein at least one electronic key of the first set of electronic keys comprises a sequence of alphanumeric or symbolic characters of the stored access code;
generating a second set of electronic keys based on the screen size of the display, wherein each electronic key of the second set of electronic keys comprises an alphanumeric or symbolic character that is not a part of the stored access code;
generating a keypad that includes the first set of electronic keys and the second set of electronic keys; and
presenting the keypad in the display of the computer device.

14. The non-transitory computer-readable medium of claim 13, the operations further comprising:
receiving the access code via the first set of electronic keys; and
permitting an activity based on the receipt of the access code.

15. The non-transitory computer-readable medium of claim 14, wherein the activity includes at least one of: access to the computer device, a financial transaction, or access to a remote device.

16. The non-transitory computer-readable medium of claim 13, wherein the generating the first set of electronic keys based on the set of possible objects for the access code comprises:
identifying the access code in a data storage.

17. The non-transitory computer-readable medium of claim 13, wherein the identifying the set of possible objects for the access code comprises determining an access code type, wherein the access code type includes at least one of: numeric, alphabetical, alphanumeric, or symbolic, wherein the access code includes at least one user-defined symbol.

* * * * *